United States Patent [19]
Hochella et al.

[11] Patent Number: 5,278,124
[45] Date of Patent: Jan. 11, 1994

[54] LOW PRESSURE DROP, HIGH SURFACE AREA AMMONIA OXIDATION CATALYST

[75] Inventors: William A. Hochella, Coatesville; Steven A. Heffernen, Ambler, both of Pa.

[73] Assignee: Johnson Matthey, Inc., Valley Forge, Pa.

[21] Appl. No.: 917,385

[22] Filed: Jul. 23, 1992

Related U.S. Application Data

[62] Division of Ser. No. 716,539, Jun. 17, 1991, Pat. No. 5,160,722.

[51] Int. Cl.$^5$ .................... B01J 23/66; B01J 23/72; B01J 23/89
[52] U.S. Cl. .................... 502/326; 502/325; 502/330; 502/331; 502/339
[58] Field of Search ............... 502/325, 326, 330, 331, 502/339

[56] References Cited

U.S. PATENT DOCUMENTS

| | | | |
|---|---|---|---|
| 2,103,672 | 12/1937 | Heraeus | 502/339 |
| 4,022,596 | 5/1977 | Pedersen | 55/528 |
| 4,774,069 | 9/1988 | Handley | 423/403 |
| 4,929,398 | 5/1990 | Pedersen | 261/94 |

FOREIGN PATENT DOCUMENTS

| | | |
|---|---|---|
| 0259966 | 3/1988 | European Pat. Off. |
| 0364153 | 4/1990 | European Pat. Off. |
| 2829035 | 1/1980 | Fed. Rep. of Germany |
| 2855102 | 7/1980 | Fed. Rep. of Germany |
| 2062486 | 5/1981 | United Kingdom |

*Primary Examiner*—W. J. Shine
*Attorney, Agent, or Firm*—Cushman Darby & Cushman

[57] ABSTRACT

This invention is a catalytic element for use in the catalytic oxidation of ammonia. The element comprises a foraminous structure fabricated from a material consisting essentially of a metal selected from the group consisting of platinum, rhodium, palladium and alloys of mixtures thereof characterized by (a) a novel configuration whereby the initial product of the formula: curve to the flat ratio (C/F) multiplied by mesh count in inches (N) and wire diameter ($d_W$), for said element is at least about 0.08 and (b) where, for a given hydrogen throughput, the conversion efficiency is a function of the curve to flat ratio (C/F), wire diameter ($d_W$) and mesh count (N) combination and conversion efficiency is improved by increasing the mesh count (N) for a given wire diameter, increasing the wire diameter ($d_W$) for a given mesh count, and increasing the curve to flat ratio (C/F) to a ratio of above 1.0. Preferably the initial product of the formula is greater than 0.2, more preferably 0.9 and the curve to flat ratio (C/F) is above about $\pi/2$. The preferred initial product of the formula is in the range of from 0.08 to about 10 and more preferred from about 0.9 to about 10. The preferred element is woven gauze, knitted fabric, fibers and combinations thereof. The element can be in a series of said elements as a plurality of screens.

29 Claims, 5 Drawing Sheets

LOW PRESSURE DROP, HIGH SURFACE AREA AMMONIA OXIDATION CATALYST

This application is a divisional application of allowed Ser. No. 07/716,539, filed Jun. 17, 1991, now U.S. Pat. No. 5,160,722.

FIELD OF THE INVENTION

This invention relates to a low pressure drop, high surface area ammonia oxidation catalyst system and method.

BACKGROUND OF THE INVENTION

Nitric acid is produced commercially by passing ammonia and air across a flat gauze woven from platinum-rhodium-palladium alloy wire. The ammonia, initially, is converted to nitric oxide over the precious metal gauze, and the nitric oxide is, subsequently, oxidized and absorbed to form nitric acid. The conversion efficiency of ammonia to nitric oxide is a function of temperature, pressure, velocity of gas stream, volume of catalyst, and purity of the ammonia and air streams. The ammonia oxidation to nitric oxide generates a large exotherm and raises the temperature of the catalyst in the rang of 810° C. to 960° C. During the ammonia oxidation process some of the precious metal is volatilized from the surface of the gauze wire. The rate of loss is dependent on the temperature, pressure, and flow rate of gases across the catalyst surface. The cost of the precious metal lost from the ammonia oxidation catalyst is significant part of the cost of operating a nitric acid plant.

In nitric acid production, the catalyst pack consists of 3 to 50 sheets of flat woven gauze. The conventional flat woven gauze is typically made with 80 mesh per inch and 0.003" wire. However, UK patent GB 2062486B discloses the use of a system where the diameter of the wire is reduced from the front to the back of the flat woven gauze pack resulting in maximum conversion efficiency with minimum precious metal content and therefore also minimum metal loss from the catalyst. Other recent disclosures include U.S. Pat. No. 4,863,893 which claims improved catalyst "lightoff" by the use of a high surface area per unit area of catalyst by the deposition of fine platinum particles onto the surface of the flat woven gauze. U.S. Pat. No. 4,863,893 is a variation of the technology of U.S. Pat. No. 3,470,019 which had a different method of deposition. Patent application EP 0 364 153 A1 claims the use of a flat knitted fabric of precious metal for the oxidation of ammonia to nitric oxide. Recently, a flat woven gauze of 70 mesh, 0.003" wire diameter was introduced to the market place.

The catalyst pack of elements or sheets of gauze of precious metals and its use to catalyze ammonia is disclosed in U.S. Pat. No. 4,412,859, U.S. Pat. No. 4,497,657 and U.S. Pat. No. 4,526,614, all of which are hereby incorporated by reference, in toto.

By curve to flat ratio is meant the ratio of that portion of an element of a catalyst (a sheet or gauze etc.) that is not in the base plane of the element to the portion that is in that plane. When curved, it is the ratio of curved section to the flat section.

SUMMARY OF THE INVENTION

This invention is a catalytic element for use in the catalytic oxidation of ammonia. The element comprises a foraminous structure fabricated from a material consisting essentially of a metal selected from the group consisting of platinum, rhodium, palladium and alloys of mixtures thereof characterized by (a) a novel configuration whereby the initial product of the formula: curve to the flat ratio (C/F) multiplied by mesh size (N) and wire diameter ($d_W$), for said element is greater than at least about 0.08 and (b) wherefore a given nitrogen throughput, the conversion efficiency is a function of the curve to flat ratio (C/F), wire diameter ($d_W$) and mesh size (N) combination and conversion efficiency is improved by increasing the mesh size (N) for a given wire diameter, increasing the wire diameter ($d_W$) for a given mesh size, and increasing the curve to flat ratio (C/F) to a ratio of above 1.0. Preferably the initial product of the formula is greater than 0.2 and the curve to flat ratio (C/F) is above 1.00 (most preferably $\pi/2$). The preferred initial product of the formula is in the range of from 0.08 to about 10 and more preferred from about 0.2 to about 10. The preferred element is woven gauze, knitted fabric, fibers and combinations thereof. Preferably the element is in a series of said elements as a plurality of screens.

Preferably the element consists of platinum or essentially of platinum alloyed with one or more metals selected from the group consisting of nickel, cobalt, palladium, ruthenium, iridium, gold, silver and copper. The preferred element contains platinum present in an amount of at least of about 70% by weight.

The preferred embodiment of this invention is an element wherein (C/F) is in the range of from above 1.0 to about 4, N is the range of from 40 to 120, $d_W$ is in the range of from about 0.001 to 0.018 and their respective values are such that the initial product of the formula is greater than at least 0.08, more preferably C/F is from above 1.00 (most preferably $\pi/2$) to about 4 and the product of the formula is greater than 0.2. In another embodiment, the initial product is in the range of from 0.08 to about 10, more preferably from about 0.9 to about 8.

In a preferred embodiment of this invention, the C/F ratio is achieved by means of forming the element into a pleat-like configuration. The pleats are preferably parallel. Alternatively, the ratio can be achieved by means of pleats in concentric patterns. Such patterns can be circles, parallel lines or polygons. The ratio can also be achieved means of intersecting patterns resulting in the waffle-like pattern. The waffle-like pattern can be regular comprising straight lines or curved lines, or both. The waffle-like pattern could also be random with either straight or curved lines, or both. In another embodiment the C/F ratio can be achieved by means of shaped depressions on the surface of the element.

The method of this invention is a method for catalytic oxidation of ammonia at temperatures above 850° C. which comprises using as catalyst a foraminate element fabricated from metal consisting essentially of a metal from the group consisting of platinum, rhodium, palladium and alloys of mixtures thereof characterized by (a) a novel configuration whereby the initial product of the formula: curve to flat ratio (C/F) multiplied by mesh size (N) and wire diameter ($d_W$) for the element, is greater than at least about 0.08 and (b) where, for a given nitrogen throughput, the conversion efficiency is a function of the curve to flat ratio (C/F), wire diameter ($d_W$) and mesh size (N) combination and conversion efficiency is improved by increasing the mesh size (N) at a given wire diameter, increasing the wire diameter ($d_W$). at a given mesh size, and increasing the curve to flat ratio (C/F) to a ratio of above 1.0. Preferably the formula product is greater than about 0.9 and the C/F ratio is above about $\pi/2$. Preferably the product of the formula is in the range of from about 0.08 to about 10, more preferably to about 8, most preferably about 0.20 to about 8.

The method preferably uses elements of woven gauze, knitted fabric, fibers or combinations thereof. Preferably the elements are in a plurality screens. The preferred method of this invention uses elements consisting essentially of platinum or platinum alloys of one or more metals selected from the group consisting of nickel, cobalt, palladium, rhodium, ruthenium, iridium, gold, silver and copper. Preferably platinum is present in the amount of at least about 70% by weight.

The preferred method of this invention is where (C/F) is in a range of from about greater than 1.0 to about 4, N is in the range of from about 40 to about 120, $d_W$ is in the range of from about 0.001 to about 0.018 and their respective values are such that the initial product of the formula is greater than about 0.08. Most preferably C/F is in a range of from about $\pi/2$ to about 4 and the initial product of the formula is greater than at least of about 0.9. Preferably the initial product of the formula is in the range of from about 0.08 to 10 and most preferably from about 0.2 to 8. Another embodiment of this invention when using multiple elements of this invention is modulating the initial product of the formula across the elements. The product can be modulated to change from higher at those elements initially contacted by ammonia to lower where the ammonia last contacts the elements. Or vice versa, from lower as the elements initially contacts the ammonia to higher where the ammonia last contacts the elements. The product of the formula can change by a recognizable pattern across the system, preferably a pattern described a variety of mathematical functions, most preferably the mathematical function selected from the groups consisting of linear, parabolic, hyperbolic, step, sinusoidal and combinations thereof. This modulation described above is useful both in the method of this invention and in the catalyst system using elements described by this invention.

The modulation may be by varying any one of the product multipliers C/F, d or N independently and/or in coordination, C/F N and $d_W$ may be constant or variable both screen-to-screen and/or across each screen and independently varied across the warp and/or across the weft of the woven or knitted screen. Thus, when variable within the screen, the definition of C/F, N and $d_W$ in this invention shall all be average numbers for each individual screen. For example, varying both N and $d_W$, the formula would be calculated as follows.

Warp: 50 wires per inch @ .0058 inch wire diameter.
Weft: 30 wires per inch @ .0097 inch wire diameter.
Developed Curve to Flat: 2.61

$$C/F \times N \times dw = \frac{(50 + 30)}{2} \times \frac{(.0058 + .0097)}{2} \times 2.61 = .8091$$

This invention provides the following benefits.

1. By using a C/F ratio over 1, formerly flat screens are made three-dimensional, thereby increasing the surface area for greatly improved catalytic activity of the catalyst element. For example, using typical 80 mesh, 3 mil (0.003") screen, surface area per cross sectional area of the reactor can be increased threefold from 1.5 units at C/F equals 1, i.e. flat, to 4.5 units at C/F equals 3.

2. The higher surface area, per screen, made possible by increasing C/F ratio permits fewer elements or screens in the system and lower pressure difference across the total system used. This in turn permits higher throughput rates of ammonia through the system, i.e., more tons per day conversion of ammonia from the same equipment.

3. The conversion of ammonia over the catalyst elements (screens) is also improved by the higher surface area of each element, more ammonia, per ton of ammonia throughput, is converted to nitric acid through the same equipment.

4. By another embodiment of this invention, namely, modulation of the factors determining surface area, either individually or by the formula, C/F (N) dw, the catalyst surface area can by tailored to be maximum at the point in the system (screen pack) it is most effective and efficient.

DISCUSSION

Figure 1:
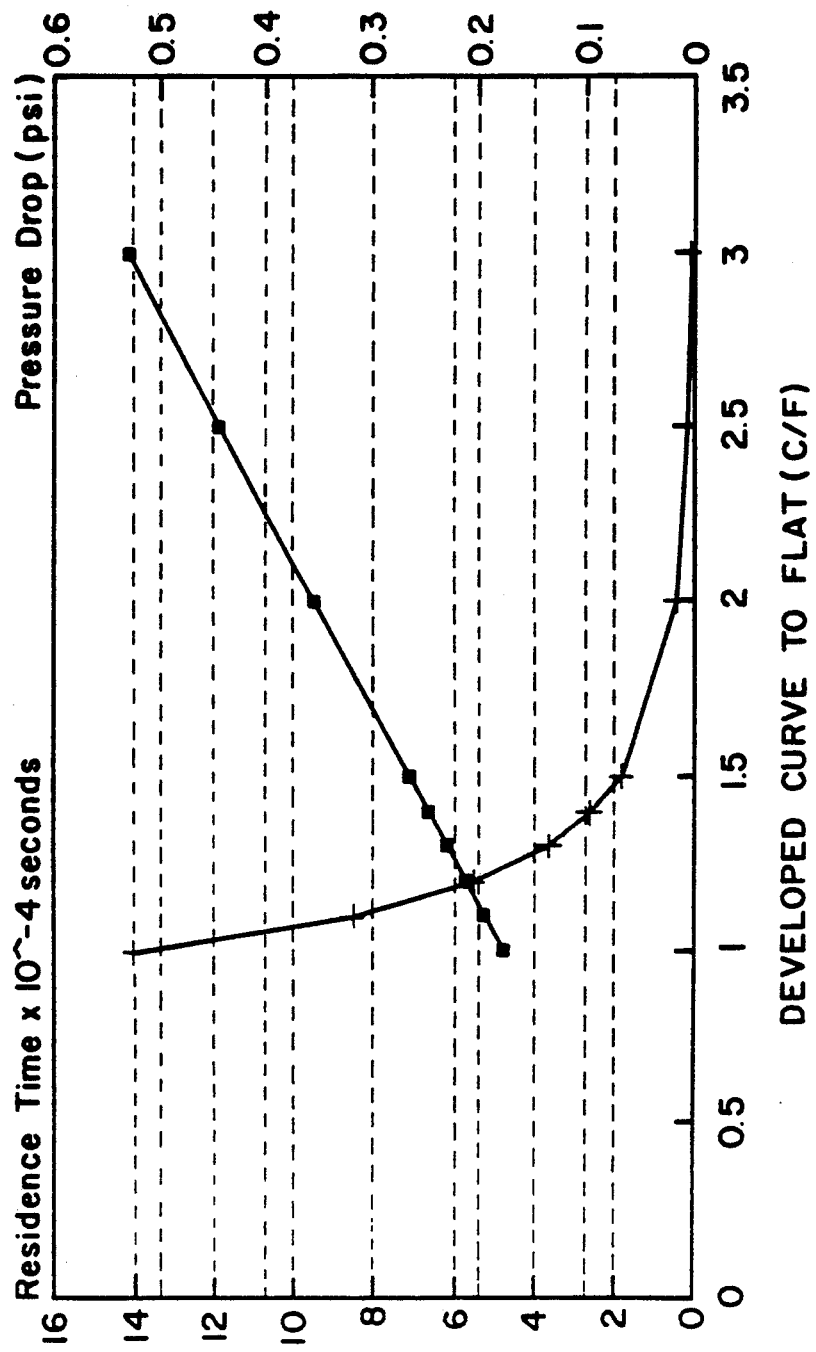
FIG. 1 is a computer model generated set of curves projecting how the low pressure drop catalyst system would lower pressure drop and increase residence time in 100 T/m²/day plant using 30 sheets of 3 mil (0.003") 80 mesh sheets (elements) at varying C/F ratios.

FIG. 1 shows that pressure drop across the system would be significantly lower, especially above C/F of $\pi/2$ and residence times can be significantly increased at higher C/F ratios than 1. For example, residence time is doubled between C/F values of about 1.1 and about 1.6.

Figure 2:
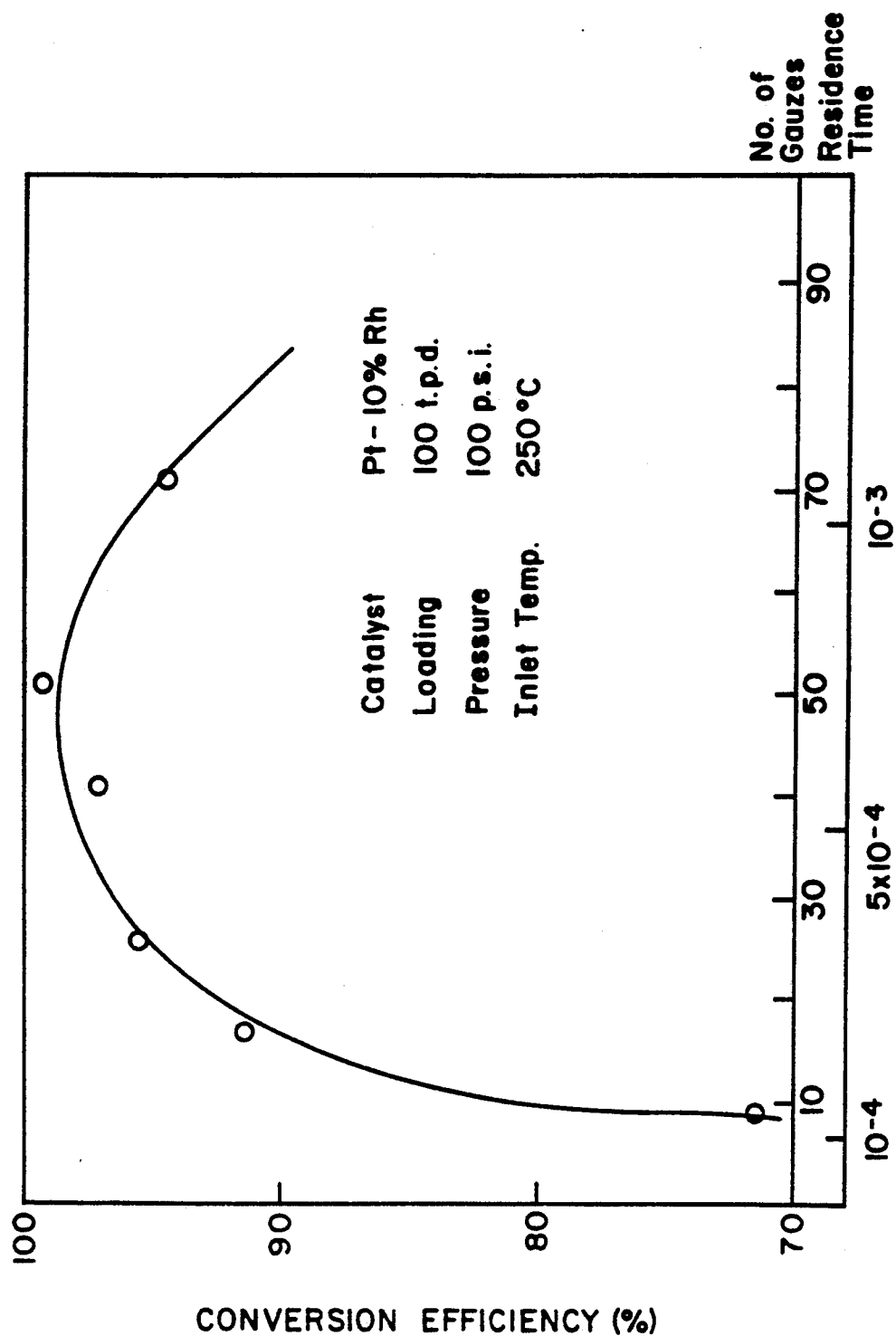
FIG. 2 is a prior art curve of actual values of conversion efficiency at various residence time (sec.)/number of gauzes (elements).
Figure 3:
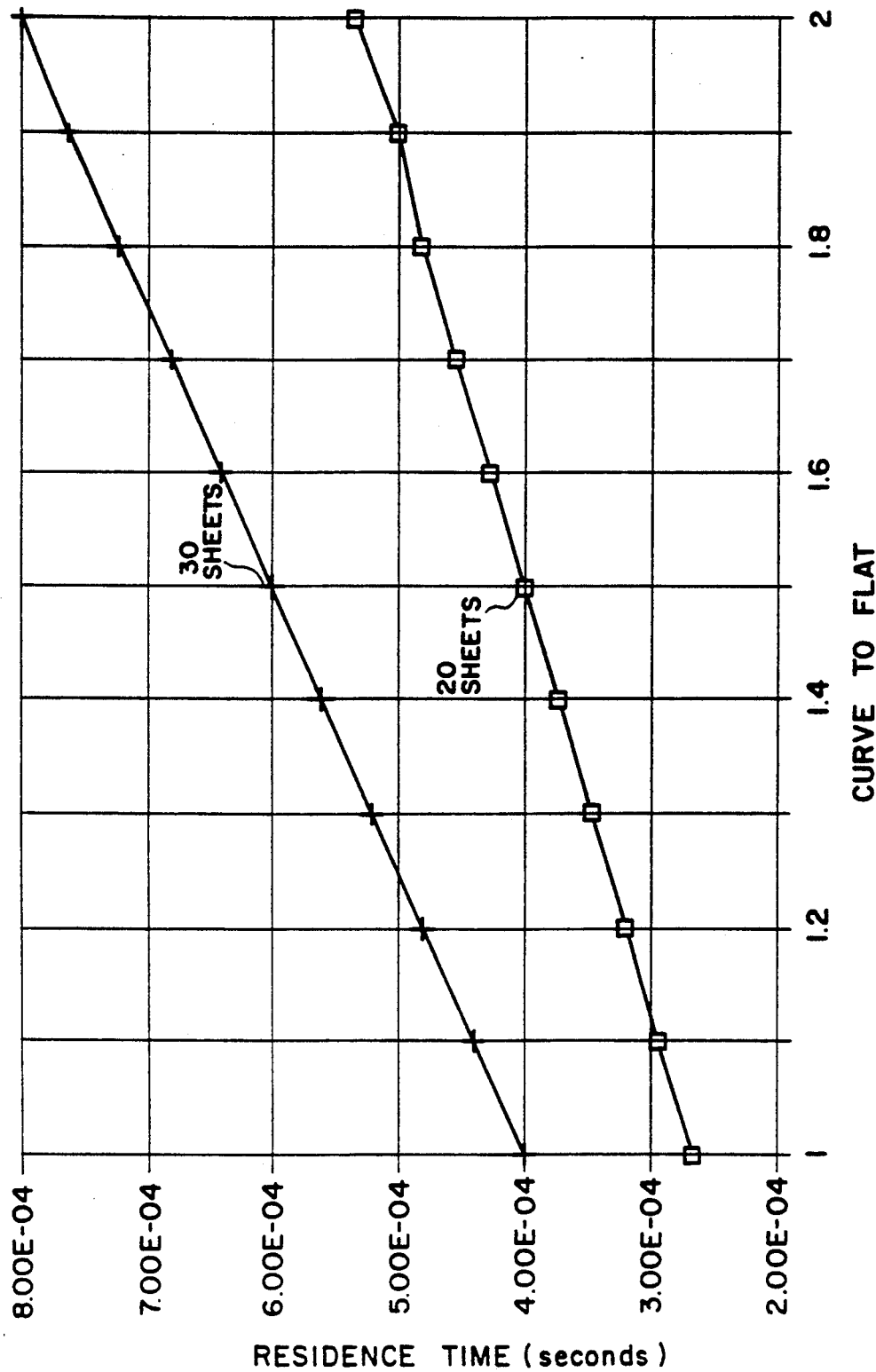
FIG. 3 is a set of curves showing improved residence time at higher C/F (curve to flat) ratios.

FIG. 2 shows the importance of residence time in a prior art system at the conditions shown. The curve shows that conversion efficiency increases with residence time to an optimum at a residence time of about $7 \times 10^{-4}$ seconds with about 50 gauzes (elements or sheets).

Thus in a preferred embodiment of this invention, the optimum residence time would be found for the commercial plant in which the system will be used. Then the curves similar to FIG. 1 would be generated using the nitrogen loading, number of sheets in the catalyst system and the desired mesh and wire diameter of each sheet desired. A series of such curves could be generated for various desired wire diameters and meshes. Then the computer generated residence time and pressure drop curves would make possible picking a C/F ratio for the actual commercial application. For a crude example, for the 100 T/m²/day ammonia conversion plant using a 30 sheet (elements) catalyst system of 3 mil wire diameter, 80 mesh catalyst (90% pt: 10% Rh) would pick the highest C/F ratio available (or practicable) using FIG. 1.

DESCRIPTION OF PREFERRED EMBODIMENT

A computer model of the system of this invention is used to predict performance of various catalyst systems is various commercial plant situations.

EXAMPLE 1

Nitric Acid Production: 100 Tons per Day
Nitrogen Loading: 116 tons N/meter$^2$/day
Inlet Temperature: 250 degrees Celsius
Number of Woven Sheets: 30

Figure 4:
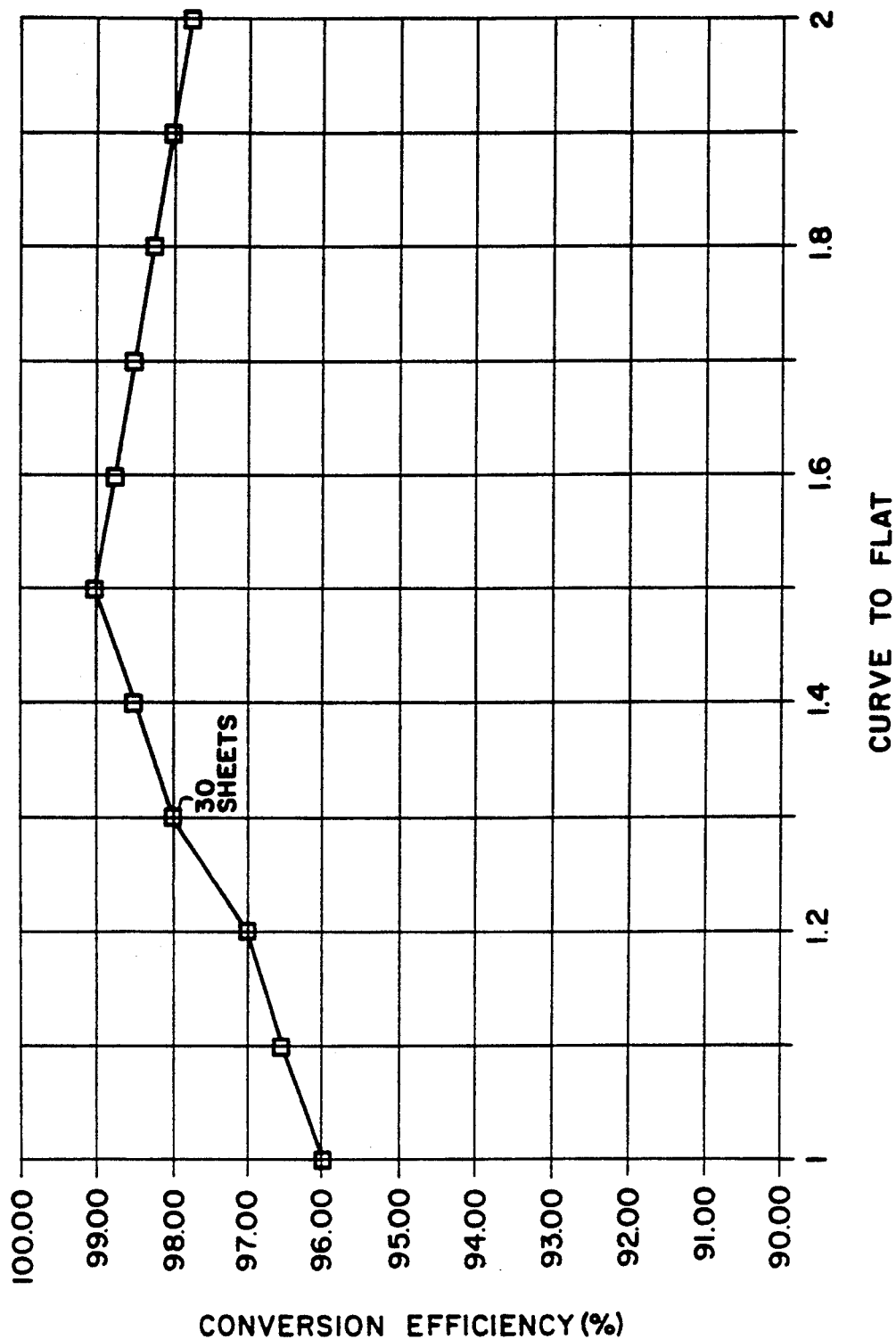
FIG. 4 is a curve showing conversion efficiency at a 100 ton nitric acid plant using 30 sheets (elements) of catalyst at various C/F ratios.

The current residence time for a flat system is $4 \times 10^{-4}$ seconds with a conversion efficiency of 96% (see FIG. 4 for 30 sheets).

It has been found through experimentation that the optimum efficiency is obtained at a residence time of $6.0 \times 10^{-4}$ seconds. To obtain this optimum residence time, the developed curve to flat ratio must be increased from 1 to 1.5. This will increase the conversion of ammonia from 96% to 99% at the same operating conditions.

EXAMPLE 2

The operating conditions are the same as the preceding example.

Figure 5:
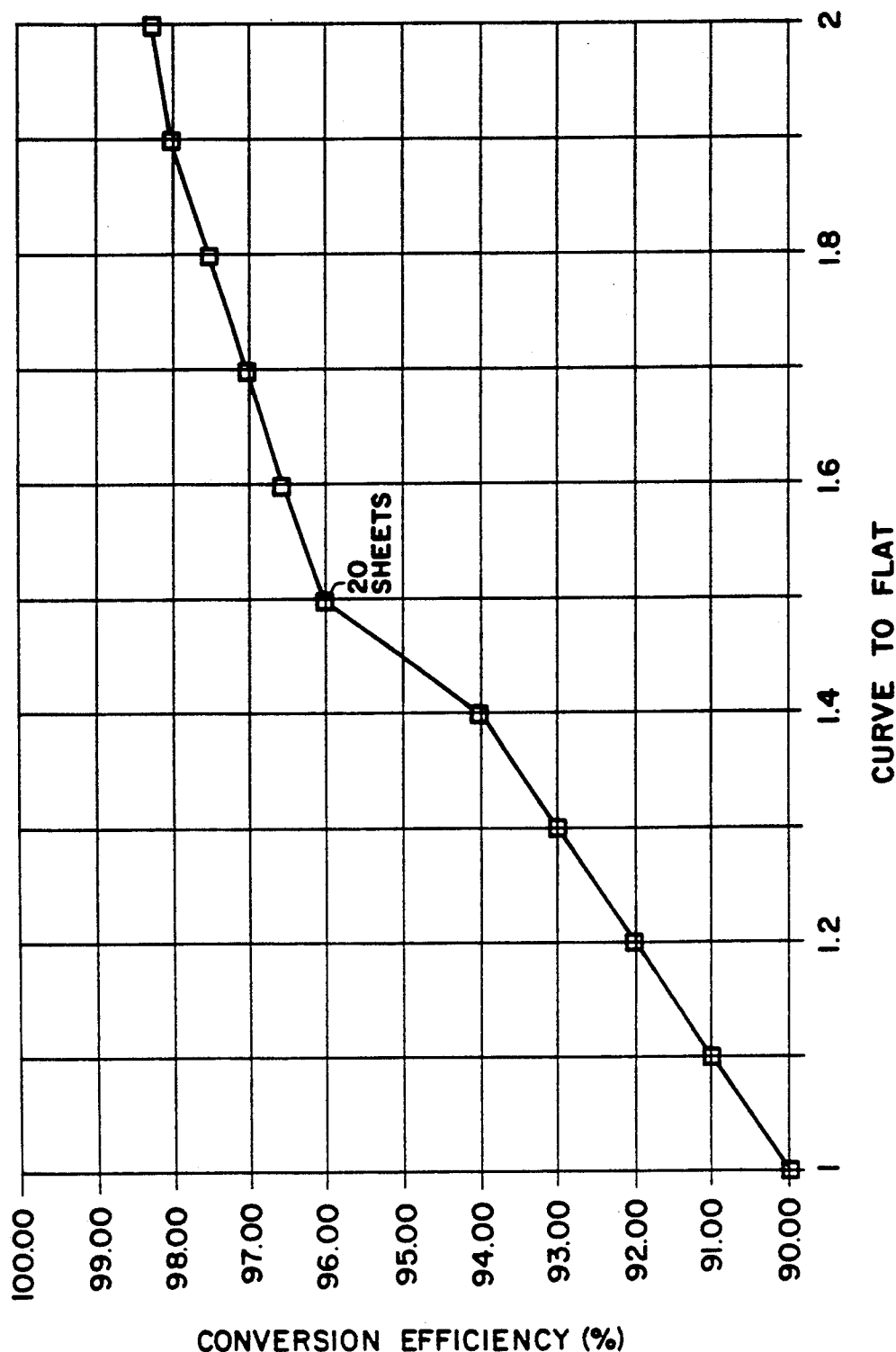
FIG. 5 is a second curve showing conversion efficiency but with 20 sheets (elements).

The nitric acid producer is interested in increasing conversion efficiency, and would like to lower the precious metal loading in his reactor. This can be achieved by arbitrarily reducing the number of sheets being used. For the number of sheets equal to 20, the curve to flat ratio must be increased from 1 to 1.5 to obtain a conversion efficiency of 96% (see FIG. 5 for 20 sheets).

While the invention has been described in connection with what is presently considered to be the most practical and preferred embodiments, the invention is not limited to the disclosed embodiment but, on the contrary, is intended to cover various modifications and equivalents included within the spirit and scope of the following claims.

We claim:

1. A catalytic element for use in the catalytic oxidation of ammonia, said element comprising a foraminous structure fabricated from a material consisting essentially of a metal selected from the group consisting of platinum, rhodium, palladium and alloys of mixtures thereof characterized by (a) a novel configuration whereby the initial product of the formula: curve to flat ratio (C/F) multiplied by mesh count per inch (N) and wire diameter in inches ($d_W$), for said element is at least about 0.08 to about 10 and (b) where, for a given ammonia throughput, the conversion efficiency is a function of the curve to flat ratio (C/F), wire diameter ($d_W$) and mesh count (N) combination and conversion efficiency is improved by increasing the mesh count (N) for a given wire diameter, increasing the wire diameter ($d_W$) for a given mesh count, and increasing the curve to flat ratio (C/F) to a ratio of above 1.0.

2. The element of claim 1, wherein the initial product of said formula is greater than 0.9 and the curve to flat ratio (C/F) is above about $\pi/2$.

3. The element of claim 1 wherein said product is from about 0.2 to about 10.

4. The element of claim 1 wherein said element is a woven gauze, knitted fabric, fibers or combinations thereof.

5. The element according to claim 1 wherein said element is in a plurality of screens.

6. The element of claim 1 wherein said element consists essentially of platinum alloyed with one or more metals selected from the group consisting of nickel, cobalt, palladium, rhodium, ruthenium, iridium, gold, silver and copper.

7. The element of claim 6 wherein the platinum is present in an amount of at least about 70% by weight.

8. The element of claim 1 wherein C/F is in the range of from about 1.00 to about 4 and the product of said formula is greater than about 0.08.

9. The element of claim 1 wherein C/F is in the range of from above 1.0 to about 4, N is in the range of from about 40 to 120, $d_W$ is in the range of from about 0.001 to 0.018 and their respective values are such that the initial product of said formula is greater than at least about 0.08.

10. The element of claim 9 wherein said product is from about 0.2 to about 8.

11. The element of claim 1 wherein said C/F ratio is achieved by means of forming said element into a pleat-like configuration.

12. The element of clam 11 wherein the pleats are parallel.

13. The element of claim 11 wherein said C/F ratio achieved by means of pleats in concentric patterns.

14. The element of claim 13 wherein said patterns are selected from the group of circles and polygons.

15. The element of claim 11 wherein said C/F ratio is achieved by means of intersecting patterns resulting in a waffle-like pattern.

16. The element of claim 15 wherein said waffle-like pattern is regular, and comprises straight lines.

17. The element of claim 16 wherein said waffle-like pattern is regular and comprised of curved lines.

18. The element of claim 15 wherein said waffle-like pattern is random.

19. The element of claim 11 wherein said C/F ratio achieved by means of shaped depressions on the surface of said element.

20. An ammonia oxidation catalyst system comprising elements according to claim 1 wherein said initial product of said formula is modulated across the elements, element to element.

21. The system of claim 20 wherein said product changes from a higher number at the elements initially contacted by ammonia to a lower number ammonia last contacts the elements.

22. The system of claim 20 wherein said product changes from a lower number at the elements initially contacted by ammonia to a higher number where said ammonia last contacts the elements.

23. The system of claim 20 wherein said product changes by a mathematical pattern of change across the system.

24. The system of claim 23 wherein said mathematical function is selected from the group consisting of linear, parabolic, hyperbolic, step, sinusoidal and combinations thereof.

25. The system of claim 20 wherein said C/F ratio value is modulated.

26. The system of claim 25 wherein said ratio changes from a higher number at the elements initially contacted by ammonia to a lower number when said ammonia last contacts the elements.

27. The system of claim 25 wherein said ratio changes from a lower number at the elements initially contacted by ammonia to a higher number where said ammonia last contacts the elements.

28. The system of claim 25 wherein said ratio changes by a mathematical pattern of change across the system.

29. The system of claim 28 wherein said mathematical function is selected from the group consisting of linear, parabolic, hyperbolic, step, sinusoidal and combinations thereof.

* * * * *